US009455449B2

(12) United States Patent
Han et al.

(10) Patent No.: US 9,455,449 B2
(45) Date of Patent: Sep. 27, 2016

(54) ELECTRODE FOR FUEL CELL, AND MEMBRANE-ELECTRODE ASSEMBLY AND FUEL CELL SYSTEM INCLUDING SAME

(75) Inventors: Sang-Il Han, Yongin-si (KR); Kah-Young Song, Yongin-si (KR); Hee-Tak Kim, Yongin-si (KR); Sung-Yong Cho, Yongin-si (KR); Tae-Yoon Kim, Yongin-si (KR); Myoung-Ki Min, Yongin-si (KR); Geun-Seok Chai, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 349 days.

(21) Appl. No.: 13/339,732

(22) Filed: Dec. 29, 2011

(65) Prior Publication Data

US 2013/0017461 A1 Jan. 17, 2013

(30) Foreign Application Priority Data

Jul. 13, 2011 (KR) .................. 10-2011-0069485

(51) Int. Cl.
*H01M 8/06* (2016.01)
*H01M 8/10* (2016.01)
*H01M 4/86* (2006.01)
*H01M 4/90* (2006.01)
(Continued)

(52) U.S. Cl.
CPC ......... *H01M 4/8605* (2013.01); *H01M 4/9083* (2013.01); *H01M 8/0612* (2013.01); *H01M 8/1002* (2013.01); *B82Y 30/00* (2013.01); *H01M 4/926* (2013.01); *Y02E 60/521* (2013.01)

(58) Field of Classification Search
CPC ............ H01M 4/86; H01M 8/10; H01M 8/06
USPC ....... 429/530, 532, 523, 423, 492, 490, 483, 429/42
See application file for complete search history.

(56) References Cited

U.S. PATENT DOCUMENTS 4,547,418 A * 10/1985 Shigeta et al. ................. 428/167
5,910,378 A * 6/1999 Debe et al. .................... 429/483
(Continued)

FOREIGN PATENT DOCUMENTS

JP 3503193 12/2003
JP 2008-103164 A 1/2008
(Continued)

OTHER PUBLICATIONS

"Toray Carbon Fiber Paper TGP-H", retrieved online on May 21, 2014 from: http://fuelcellearth.com/shop/carbon/product/6-toray-paper-120#download.*
(Continued)

*Primary Examiner* — Kenneth Douyette
(74) *Attorney, Agent, or Firm* — Knobbe, Martens, Olson & Bear LLP

(57) ABSTRACT

An electrode for a fuel cell is disclosed. The electrode may include an electrode substrate with a conductive substrate, carbon particles, and a catalyst layer disposed on the electrode substrate. The electrode substrate may include a pore having an average diameter of about 20 μm to about 40 μm and porosity of about 30 volume % to about 80 volume % based on the total volume of the electrode substrate. A membrane-electrode assembly including the electrode and a fuel cell system including the membrane electrode assembly are also disclosed.

14 Claims, 7 Drawing Sheets

(51) Int. Cl.
  *H01M 4/92* (2006.01)
  *B82Y 30/00* (2011.01)

(56) References Cited

U.S. PATENT DOCUMENTS

| | | | |
|---|---|---|---|
| 2003/0134178 A1 | 7/2003 | Larson | |
| 2003/0168404 A1* | 9/2003 | Mika | B01D 61/027 210/639 |
| 2005/0118494 A1* | 6/2005 | Choi | 429/43 |
| 2005/0221153 A1* | 10/2005 | Sugimoto et al. | 429/38 |
| 2005/0238936 A1* | 10/2005 | Cho | 429/30 |
| 2006/0115711 A1* | 6/2006 | Kim | B82Y 30/00 429/434 |
| 2008/0299431 A1* | 12/2008 | Lei et al. | 429/30 |

FOREIGN PATENT DOCUMENTS

| | | |
|---|---|---|
| KR | 10-0442819 B | 7/2004 |
| KR | 10-2004-0073494 A | 8/2004 |
| KR | 10-2006-0065809 A | 6/2006 |

OTHER PUBLICATIONS

KIPO Notice of Allowance (Korean only) issued Dec. 31, 2013 in KR-10-2011-0069485; which corresponds to the present application.

M. Han, et al., Characterization of gas diffusion layer for PEMFC, Electrochimica Acta, vol. 53, pp. 5361-5367.

H. Ostadi, et al., 3D reconstruction of a gas diffusion layer and a microporous layer, Journal of Membrane Science, vol. 351, pp. 69-74.

Chung-Jen Tseng, et al., Effects of microstructure characteristics of gas diffusion layer and microporous layer on the performance of PEMFC, Energy Conversion and Management, vol. 51, pp. 674-684.

KIPO Office Action (Korean only) issued May 9, 2013 in KR-10-2011-0069485; which corresponds to the present application.

J. Lobato et al., Optimisation of the Microporous Layer for a Plybenzimidazone-Based High Temperature PEMFC—Effect of Carbon Content, Fuel Cells, vol. 10, pp. 770-777.

* cited by examiner

ELECTRODE FOR FUEL CELL, AND MEMBRANE-ELECTRODE ASSEMBLY AND FUEL CELL SYSTEM INCLUDING SAME

CROSS-REFERENCE TO RELATED APPLICATIONS

This application claims priority to and the benefit of Korean Patent Application No. 10-2011-0069485 filed in the Korean Intellectual Property Office on Jul. 13, 2011, the entire contents of which are incorporated herein by reference.

BACKGROUND

1. Field

This disclosure relates to an electrode for fuel cell, a membrane-electrode assembly including the same and a fuel cell system including the same.

2. Description of the Related Technology

A fuel cell is a power generation system for producing electrical energy through an electrochemical redox reaction of an oxidant and hydrogen included in a hydrocarbon-based material such as methanol, ethanol, or natural gas. Such a fuel cell is a clean energy source with the potential to replace fossil fuels. Fuel cells include a stack of unit cells each configured to produce various ranges of power output. Since a fuel cell may have about four to ten times higher energy density than a small lithium battery, fuel cells may be small and portable power sources.

Representative exemplary fuel cells include a polymer electrolyte membrane fuel cell (PEMFC) and a direct oxidation fuel cell (DOFC), including a direct methanol fuel cell that uses methanol (DMFC) as a fuel. The polymer electrolyte fuel cell has an advantage of high energy density and high power, but also has problems in the need to carefully handle hydrogen gas and the requirement of accessory facilities such as a fuel reforming processor for reforming methane or methanol, natural gas, and the like to produce hydrogen as the fuel gas. A direct oxidation fuel cell, however, has a relatively lower energy density than that of the polymer electrolyte fuel cell, but it has an advantage of easy handling of a fuel. It also has further advantages including being capable of operating at room temperature due to its low operation temperature, and begin able to operate without additional fuel reforming processors.

In one of the above fuel cells, a stack capable of generating electricity generally includes a number of unit cells stacked in multiple layers. Each unit cell is formed of a membrane-electrode assembly (MEA) and a separator (also referred to as a bipolar plate). The membrane-electrode assembly is formed of an anode (also referred to as a "fuel electrode" or an "oxidation electrode") and a cathode (also referred to as an "air electrode" or a "reduction electrode") separated by a polymer electrolyte membrane.

SUMMARY OF CERTAIN INVENTIVE ASPECTS

In a first aspect, an electrode for a fuel cell having excellent performance under non-humid (dry) conditions is provided.

In another aspect, a membrane-electrode assembly including an electrode for a fuel cell is provided.

In another aspect, a fuel cell including a membrane-electrode assembly having an electrode for a fuel cell is provided.

In another aspect, an electrode for fuel cell includes, for example, an electrode substrate having a conductive substrate and a carbon particle, and a catalyst layer disposed on the electrode substrate.

In some embodiments, the electrode substrate includes a pore with an average diameter ranging from about 20 µm to about 40 µm and porosity ranging from about 30 volume % to about 80 volume % based on a total volume of the electrode substrate. In some embodiments, the average pore diameter is between about 20 µm to about 30 µm and the porosity is about 50 volume % to about 80 volume %. In some embodiments, the electrode substrate has a micropore diameter of less than about 50 µm with a porosity of more than about 30 volume %. In some embodiments, the electrode substrate has a macropore diameter of about 50 µm or more with a porosity of less than about 30 volume %. In some embodiments, the conductive substrate is formed of a material including a carbon paper, a carbon cloth, a carbon felt, a carbon fiber, and a combination thereof. In some embodiments, the carbon particle is formed of a material including carbon black, carbon powder, acetylene black, porous carbon, graphite, carbon nanotube (CNT), a carbon nanofiber (CNF), activated carbon, and a combination thereof. In some embodiments, the carbon particle has an average particle diameter of about 3 nm to about 20 nm. In some embodiments, the carbon particle forms an agglomerate and the agglomerate may have an average particle diameter of about 100 nm to about 10 µm. In some embodiments, the carbon particle is formed in a sphere or a shapeless shape. In some embodiments, the electrode substrate further includes a fluorinated resin. In some embodiments, the fluorinated resin is formed of a material including polytetrafluoroethylene (PTFE), polyvinylidene fluoride, polyhexafluoropropylene, polyperfluoroalkylvinylether, polyperfluorosulfonylfluoridealkoxyvinyl ether, fluorinated ethylene propylene, polychlorotrifluoroethylene, and one or more a copolymers thereof. In some embodiments, the carbon particle is formed inside the electrode substrate. In some embodiments, the carbon particle is formed inside and on the surface of the electrode substrates. In some embodiments, the electrode further includes a microporous layer. In some embodiments, the microporous layer has a thickness ranging from about 3 µm to about 80 µm.

In another aspect, a membrane-electrode assembly for a fuel cell includes, for example, an anode and a cathode formed facing each other; and a polymer electrolyte membrane disposed between the anode and the cathode.

In some embodiments, at least one of the anode and the cathode includes an electrode having an electrode substrate having a conductive substrate and a carbon particle, and a catalyst layer disposed on the electrode substrate.

In another aspect, a fuel cell system includes, for example, a fuel supplier configured to supply mixed fuel of fuel and water, a reforming part in fluid communication with the fuel supplier and configured to reform the mixed fuel to generate hydrogen, a stack in fluid communication with the reforming part, and an oxidizing agent supplier configured to supply an oxidizing agent to the reforming part and to the stack.

In some embodiments, the stack includes an electrode having an electrode substrate having a conductive substrate and a carbon particle, and a catalyst layer disposed on the electrode substrate. In some embodiments, the stack is configured to generate electric energy by performing an electrochemical reaction between the hydrogen gas supplied from the reforming part and an oxidizing agent.

In another aspect, a fuel cell electrode may have excellent performance under non-humid (dry) conditions.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
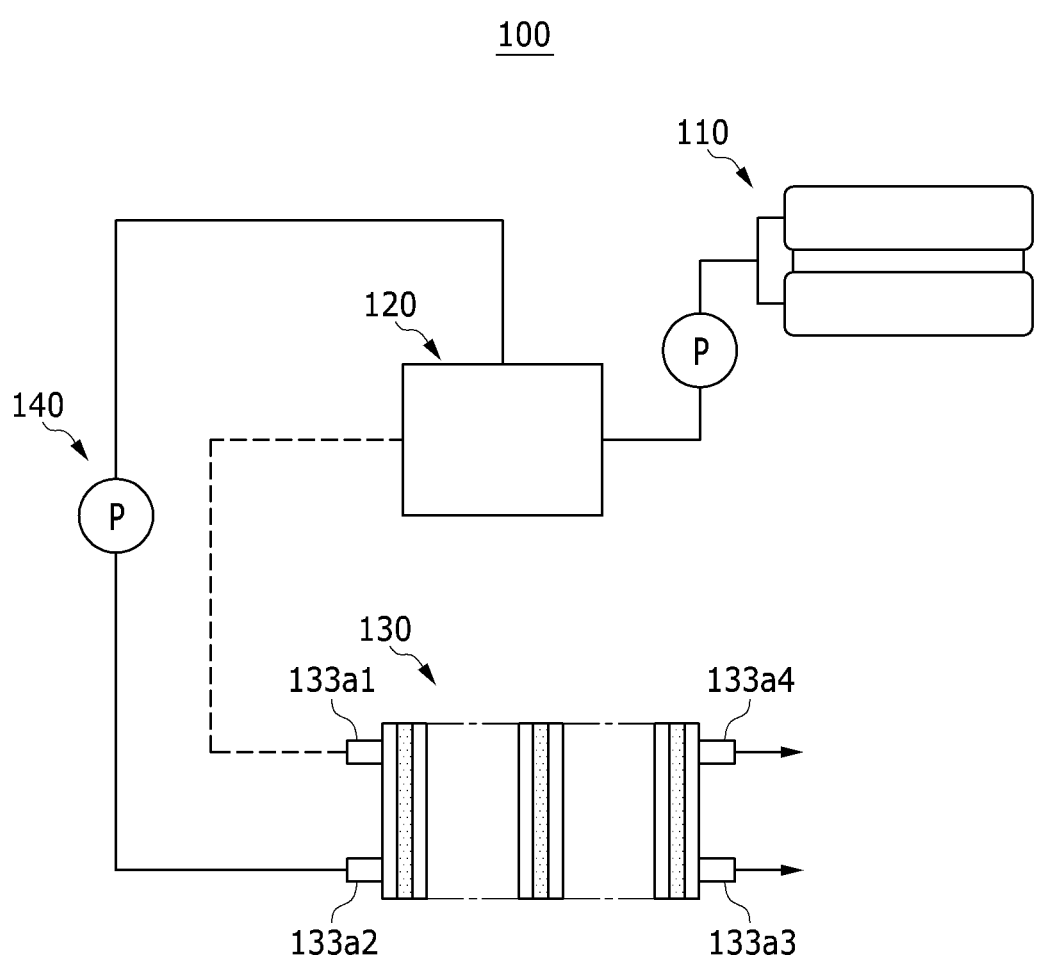
FIG. 1 is a schematic diagram illustrating a fuel cell system in accordance with the present disclosure.

In the following detailed description, only certain exemplary embodiments have been shown and described, simply by way of illustration. As those skilled in the art would realize, the described embodiments may be modified in various different ways, all without departing from the spirit or scope of the present disclosure. Reference will now be made in detail to exemplary embodiments of the present invention, examples of which are illustrated in the accompanying drawings. The embodiments are described below to explain the present invention by referring to the figures. The invention may, however, be embodied in many different forms and should not be construed as limited to the exemplary embodiments set forth herein. Further, in the embodiments, like reference numerals designate like elements throughout the specification representatively in a first embodiment, and only elements of embodiments other than those of the first embodiment will be described. The drawings and description are to be regarded as illustrative in nature and not restrictive. However, it should be understood that the disclosure is not limited to a specific embodiment but includes all changes and equivalent arrangements and substitutions included in the spirit and scope of the disclosure. Rather, these embodiments are provided so that this disclosure will be thorough and complete, and will fully convey the scope of the invention to those skilled in the art. Descriptions of unnecessary parts or elements may be omitted for clarity and conciseness, and like reference numerals refer to like elements throughout. In the drawings, the size and thickness of layers and regions may be exaggerated for clarity and convenience.

When a specific description is not otherwise provided, the term "carbon particles exist between conductive substrates" indicates that carbon particles are agglomerated between conductive substrates and in addition, surround partly or overall the surface of a conductive substrate.

It will be understood that when an element such as a layer, film, region, or substrate is referred to as being "on" another element, it can be directly on the other element or intervening elements may also be present.

The electrode for fuel cell according to one embodiment includes an electrode substrate including an electrode substrate including a conductive substrate and a carbon particle and a catalyst layer disposed on the electrode substrate. The electrode substrates are configured to support the anode and cathode and configured to provide a path for transferring the fuel and oxidant to catalyst layers. The carbon particles may exist inside the electrode substrate, or inside and on the surface of the electrode substrate. In addition, the carbon particles may exist between the conductive substrates inside the electrode substrate. In particular, the carbon particles may be agglomerated between the conductive substrates and further, surround partly or completely the surface of a conductive substrate.

The conductive substrate may include a carbon paper, a carbon cloth, a carbon felt, a carbon fiber, or a combination thereof. In one embodiment, a carbon fiber may be preferable. The carbon particle may include carbon black, carbon powder, acetylene black, porous carbon, graphite, carbon nanotube (CNT), a carbon nanofiber (CNF), activated carbon, or a combination thereof. The carbon particle may have an average particle diameter of about 3 nm to about 20 nm. The carbon particles may be agglomerated between the conductive substrates. Herein, the agglomerate may have an average particle diameter ranging from about 100 nm to about 10 µm. In some embodiments, the agglomerate may have an average particle diameter ranging from about 300 nm to about 700 nm. When the carbon particle and the agglomerate have an average particle diameter within an appropriate range, they may be permeated inside the conductive substrate, which may easily control pores of an electrode substrate. The carbon particle may be formed in a sphere or shapeless shape.

According to one embodiment of the present disclosure, an electrode substrate may be fabricated by dipping a conductive substrate in slurry including carbon particles, including carbon particles in a conductive substrate in a spray or dipping method and carbonizing it, or impregnating carbon particles on the surface of a conductive substrate in a spray method with a strong pressure. Accordingly, the manufacturing method provides an electrode substrate including carbon particles between conductive substrates.

The electrode substrate may include a fluorinated resin. The conductive substrate may be water-repellent treated with a fluorine-based resin in order to prevent deterioration of reactant diffusion efficiency due to water, while a fuel cell is operated. The fluorinated resin may include polytetrafluoroethylene (PTFE), polyvinylidene fluoride, polyhexafluoropropylene, polyperfluoroalkylvinylether, polyperfluorosulfonylfluoridealkoxyvinyl ether, fluorinated ethylene propylene, polychlorotrifluoroethylene, or a copolymer thereof.

The electrode substrate may include pores, and thus, may improve performance of a fuel cell by controlling a pore size and porosity. In other words, when a membrane-electrode assembly operated under a low humidifying condition has a pore size and porosity within a particular range, the pore may not only improve material transmission due to capillary effects but also improve water retention characteristic due to surface area and surface tension increases. The low humidifying condition may be relative humidity in a range of between 0% (non-humidifying condition) to about 50%. Specifically, the electrode substrate may include a mean pore diameter of about 20 µm to about 40 µm and a porosity of about 30 volume % to about 80 volume % based on a total volume of the electrode substrate. Specifically, the electrode substrate may include a mean pore diameter of about 20 µm to about 30 µm and a porosity of about 50 volume % to about 80 volume % based on a total volume of the electrode substrate. When an electrode substrate has a pore size and porosity within the desired range, it has excellent water retention capability under non-humid conditions, and thus, may improve over-all a fuel cell performance.

The electrode substrate may include one or more micropores having a diameter of less than about 50 µm and a porosity of more than about 30 volume % based on a total volume of the electrode substrate. The electrode substrate may include micropores having a diameter of between about 20 µm and about 50 µm at a porosity of between about 50 volume % to about 90 volume % based on a total volume of the electrode substrate. When the electrode substrate has micropores within the desired range and porosity within the desired range, it may have improved water retention capability.

The electrode substrate may have one or more macropores with a diameter of 50 µm or more and a porosity of less than about 30 volume % based on a total volume of the electrode substrate. The electrode substrate may include macropores with a diameter ranging from about 50 µm to about 400 µm and a porosity ranging from about 5 volume % to about 30 volume % based on the total volume of the electrode substrate. When the electrode substrate has macropores within the desired range and a porosity within the desired range, it may have improved water retention capability.

The electrode may further include a microporous layer configured to increase reactant diffusion effects. The microporous layer may have a thickness ranging from about 3 µm to about 80 µm or from about 10 µm to about 70 µm. When a microporous layer has a thickness within the desired range, it may prevent resistance increase due to mass transfer limitation generated by water flooding under a relative humidity condition of about 80% and also, a crack or detachment occurred by pressing a channel of a separator due to clamping pressure when a fuel cell stack is fabricated.

The microporous layer may include conductive powders having a small particle diameter, for example a carbon powder, carbon black, acetylene black, activated carbon, a carbon fiber, fullerene, carbon nanotube, carbon nano wire, a carbon nano-horn, carbon nano ring, or a combination thereof. The microporous layer may be formed by coating a composition including a conductive powder, a binder resin, and a solvent on the electrode substrate. The binder resin may include, for example, polytetrafluoroethylene, polyvinylidenefluoride, polyhexafluoropropylene, polyperfluoroalkylvinylether, polyperfluorosulfonylfluoride, alkoxyvinyl ether, polyvinylalcohol, cellulose acetate, a copolymer thereof, and the like. The solvent may include alcohols such as ethanol, isopropyl alcohol, n-propylalcohol, butanol, water, dimethyl acetamide, dimethylsulfoxide, N-methylpyrrolidone, tetrahydrofuran, and the like. The coating method may include, but is not limited to, screen printing, spray coating, doctor blade methods, gravure coating, dip coating, silk screening, painting, and so on, depending on the viscosity of the composition.

The catalyst layer may include any catalyst that may act as a catalyst at a fuel cell reaction, specifically a metal catalyst, and more specifically a platinum-based catalyst. Examples of the platinum-based catalyst may include at least one material including, for example, platinum, ruthenium, osmium, a platinum-ruthenium alloy, a platinum-osmium alloy, a platinum-palladium alloy, and a platinum-M alloy (wherein M is at least one transition element selected from Ga, Ti, V, Cr, Mn, Fe, Co, Ni, Cu, Zn, Sn, Mo, W, Rh, and Ru).

An anode and a cathode may include the same material. However, an anode catalyst may include a platinum-ruthenium alloy as an active metal in a direct oxidation fuel cell to prevent catalyst poisoning due to carbon monoxide (CO) produced during the anode reaction. Specific examples of the platinum-based catalyst may include at least one selected from Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W.

The metal catalyst may used as a metal catalyst itself, and may be supported on a carrier. The carrier may include a carbon-based material such as graphite, denka black, ketjen black, acetylene black, a carbon nanotube, a carbon nano fiber, carbon nano wire, a carbon nano ball, activated carbon, and the like, or an inorganic material particulate such as alumina, silica, zirconia, titania, and the like. Generally, the carbon-based material is used.

A noble metal supported on a carrier may be a commercially available one or may be prepared by supporting a noble metal on a carrier. The method of supporting a noble metal on a carrier is well-known in this related field and a detailed description thereof is omitted.

The catalyst layer may include a binder resin configured to improve adherence of the catalyst layer and proton transfer properties. The binder resin may be a proton conductive polymer resin having a cation exchange group selected from the group including, for example, a sulfonic acid group, a carboxylic acid group, a phosphoric acid group, a phosphonic acid group, and derivatives thereof at its side chain. Examples of the polymer include at least one proton conductive polymer selected from a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, and a polyphenylquinoxaline-based polymer, and may include at least one proton conductive polymer selected from poly(perfluorosulfonic acid), poly(perfluorocarboxylic acid), a copolymer of tetrafluoroethylene having a sulfonic acid group and fluorovinylether, sulfide polyetherketone, an aryl ketone, poly(2,2'-m-phenylene)-5,5'-bibenzimidazole, and poly(2,5-benzimidazole).

The hydrogen (H) may be replaced with Na, K, Li, Cs, or tetrabutylammonium in a proton conductive group of the proton conductive polymer. When the hydrogen (H) is substituted by Na in an ion exchange group at the terminal end of the proton conductive group, NaOH may be used. When the hydrogen (H) is replaced with tetrabutylammonium, tributylammonium hydroxide is used. K, Li, or Cs may also be replaced by using appropriate compounds. A method of substituting hydrogen (H) is known in this related art, and therefore is not further described in detail.

The binder resins may be used singularly or in combination. They may be used along with non-conductive polymers to improve adherence with the polymer electrolyte membrane. The binder resins may be used in a controlled amount according to their purposes.

Examples of the non-conductive polymers include at least one selected from polytetrafluoroethylene (PTFE), a tetrafluoroethylene-hexafluoropropylene copolymer (FEP), tetrafluoroethylene-perfluoro alkylvinylether copolymer (PFA), an ethylene/tetrafluoroethylene (ETFE), an ethylenechlorotrifluoro-ethylene copolymer (ECTFE), polyvinylidenefluoride, a polyvinylidenefluoride-hexafluoropropylene copolymer (PVdF-HFP), dodecylbenzenesulfonic acid, and sorbitol.

According to another embodiment, a membrane-electrode assembly for a fuel cell including the electrode discussed above is provided. The membrane-electrode assembly includes, for example, an anode and a cathode facing each other, and a polymer electrolyte membrane disposed between the anode and cathode. At least one of the anode and the cathode may include the electrode. The polymer electrolyte membrane may be a solid polymer electrolyte having a thickness of about 10 µm to about 200 µm, and be configured to act as an ion exchanger for transferring protons produced at a catalyst layer of an anode to a catalyst layer of a cathode.

Figure 2:
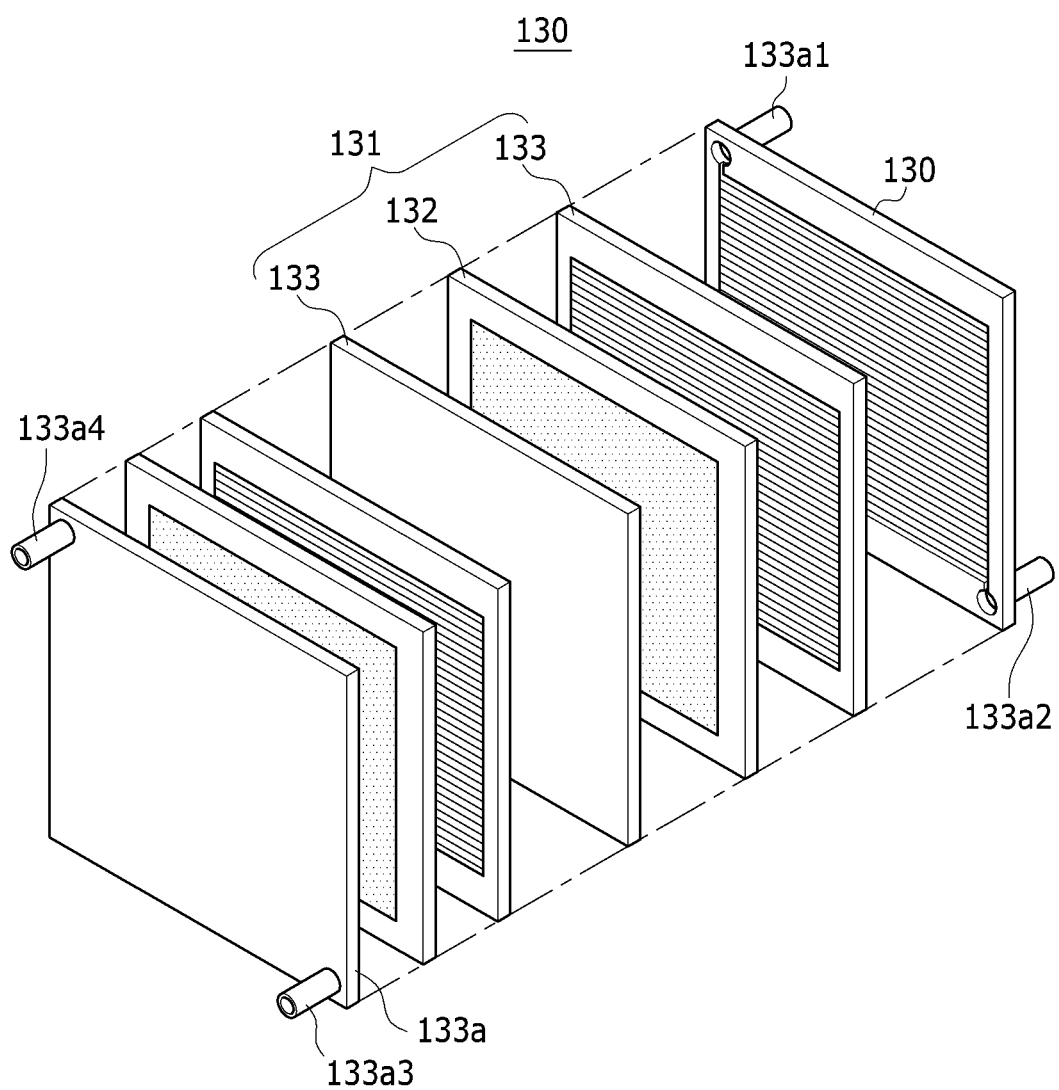
FIG. 2 is an exploded perspective view describing a stack of a fuel cell system in accordance with the present disclosure.

According to another embodiment, a fuel cell system including the membrane-electrode assembly discussed above is provided. The fuel cell system according to one embodiment is described referring to FIGS. 1 and 2. FIGS. 1 and 2 show one example of a fuel cell system, and the present invention is not limited thereto. FIG. 1 is a schematic diagram illustrating a fuel cell system, and FIG. 2 is an exploded perspective view describing a stack of a fuel cell system in accordance with the present disclosure.

Referring to FIGS. 1 and 2, a fuel cell system 100 includes a fuel supplier 110 configured to supply mixed fuel of fuel and water, a reforming part 120 configured to reform the mixed fuel to generate hydrogen, a stack 130 including a catalyst for a fuel cell configured to generate electric energy by performing an electrochemical reaction between the hydrogen gas supplied from the reforming part and an oxidizing agent, and an oxidizing agent supplier 140 configured to supply an oxidizing agent to the reforming part 120 and the stack 130.

Furthermore, the fuel cell system 100 includes a plurality of unit cells 131, which may be configured to induce an oxidation-reduction reaction between the reforming gases including hydrogen gases (which during operation of the device may be supplied from the reforming part 120) and the oxidizing agent (which during operation of the device may be supplied from the oxidizing agent supplier 140 to generate electric energy).

Each unit cell 131 may be configured to serve as a unit for generating electricity. A unit cell 131 includes a membrane-electrode assembly 132 which may be configured to oxidize and reduce the reforming gases including hydrogen gases and oxygen in the oxidizing agent, and separators 133 (also referred to as bipolar plate) which may be configured to supply the hydrogen and oxidizing agent to the membrane-electrode assembly 132. The separators 133 place the membrane-electrode assembly 132 at the center thereof, being arranged on both side of the membrane-electrode assembly 132. At this time, separators that are respectively located at the most exterior sides of the stack are referred to as, particularly, end plates 133a.

Moreover, the end plate 133a of the separators includes a first supply tube 133a1 having a pipe shape configured for injecting the hydrogen gas supplied from the reforming part 120, and a second supply tube 133a2 having a pipe shape configured for injecting the oxygen gas. The other end plate 133a includes a first discharge tube 133a3 configured for discharging the remaining hydrogen gas that does not finally react in the plurality of unit cells 131, to the outside, and a second discharge tube 133a4 configured for discharging the remaining oxidizing agent that does not react finally in the plurality of unit cells 131, to outside.

Hereinafter, the embodiments are illustrated in more detail with reference to examples. However, the following are exemplary embodiments and are not limiting.

A person having ordinary skills in this art can sufficiently understand parts of the disclosure that are not described.

Manufacturing of Fuel Cell

Example 1

10 wt % of a carbon black solid (an agglomerate having an average particle diameter of 150 to 200 nm and a sphere form) was added to isopropyl alcohol, and 10 parts by weight of polytetrafluoroethylene (PTFE) was added thereto based on 100 parts by weight of the carbon black solid, preparing a solution. Next, carbon paper was immersed in the solution for 4 hours and then, dried at 80° C. for 24 hours, fabricating an electrode substrate. Herein, the electrode substrate has an average pore size and porosity as provided in the following Table 1.

Then, a slurry was prepared by adding 20 wt % of carbon black and 10 parts by weight of polytetrafluoroethylene based on 100 parts by weight of the carbon black to isopropyl alcohol by using a Nordson spray equipment. The slurry was sprayed on the surface of the electrode substrate to form a microporous layer.

Next, each catalyst composition was prepared by using a Pt—Ru/C catalyst (Tanaka Holdings Co., Ltd.) supported on a carrier as an anode catalyst and a Pt/C catalyst supported on a carbon carrier as a cathode catalyst, perfluorosulfonate (Tradename: Nafion), isopropyl alcohol, water, and dipropyleneglycol. The catalyst compositions were agitated to prepare slurries with viscosities ranging from 2500 cP to 4000 cP. The slurry was coated on a fluorine-based film (FEP film) in a screen-printing method to form a catalyst layer.

The catalyst layer was thermally compressed on a fluorine-based membrane at 135° C. for 3 minutes, fabricating a membrane-electrode assembly.

The electrode substrate was then placed on the catalyst layer and compressed and combined with a splitter supplied with a fuel, and then, a unit cell was operated. Herein, the electrode substrate was attached to the membrane-electrode assembly.

Example 2

A unit cell was fabricated according to the same method as Example 1 except for fabricating an electrode substrate by adding 15 wt % of a carbon black solid to isopropyl alcohol. Herein, the electrode substrate had an average pore size and porosity as shown in the following Table 1.

Comparative Example 1

Carbon paper that was water-repellent due to treatment using 5 wt % of polytetrafluoroethylene (PTFE) was used as an electrode substrate. Herein, the electrode substrate had an average pore size and porosity as provided in the following Table 1.

The electrode substrate was used to fabricate a unit cell according to the same method as Example 1.

Comparative Example 2

Carbon paper that was water-repellent due to treatment using 20 wt % of polytetrafluoroethylene (PTFE) was used as an electrode substrate. Herein, the electrode substrate had an average pore size and porosity as provided in the following Table 1.

The electrode substrate was used to fabricate a unit cell according to the same method as Example 1.

Experimental Example 1

SEM Photograph Analysis of Electrode Substrate

Figure 3A:
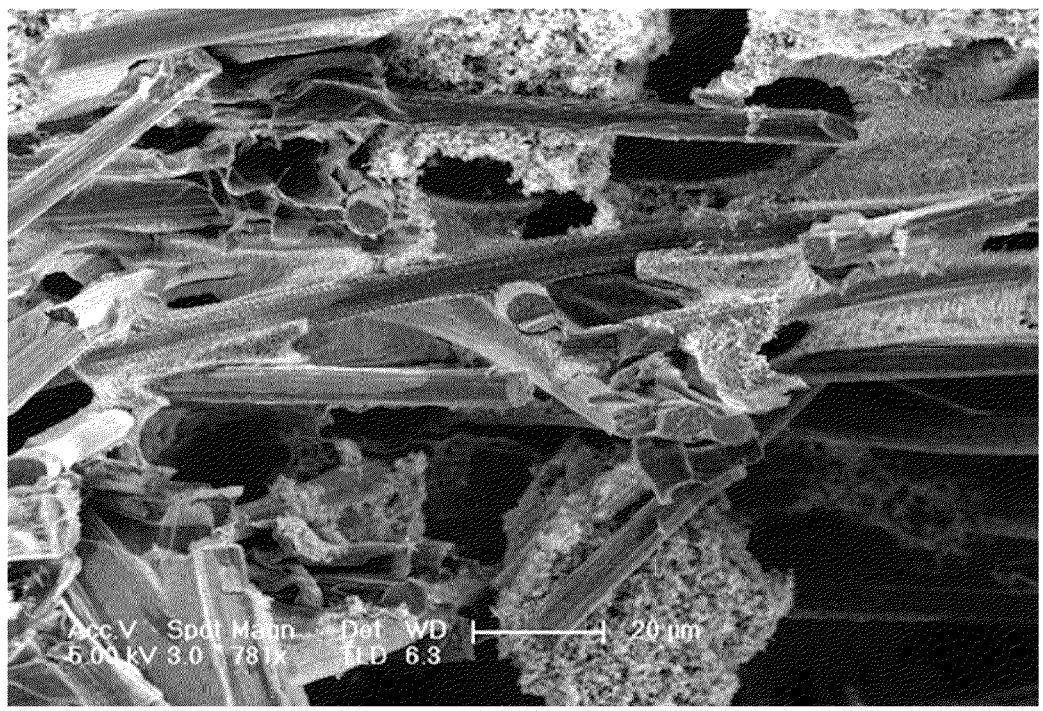
FIGS. 3A and 3B respectively show SEM photographs of the inside and the rear side of an electrode substrate according to Example 1.
Figure 3B:
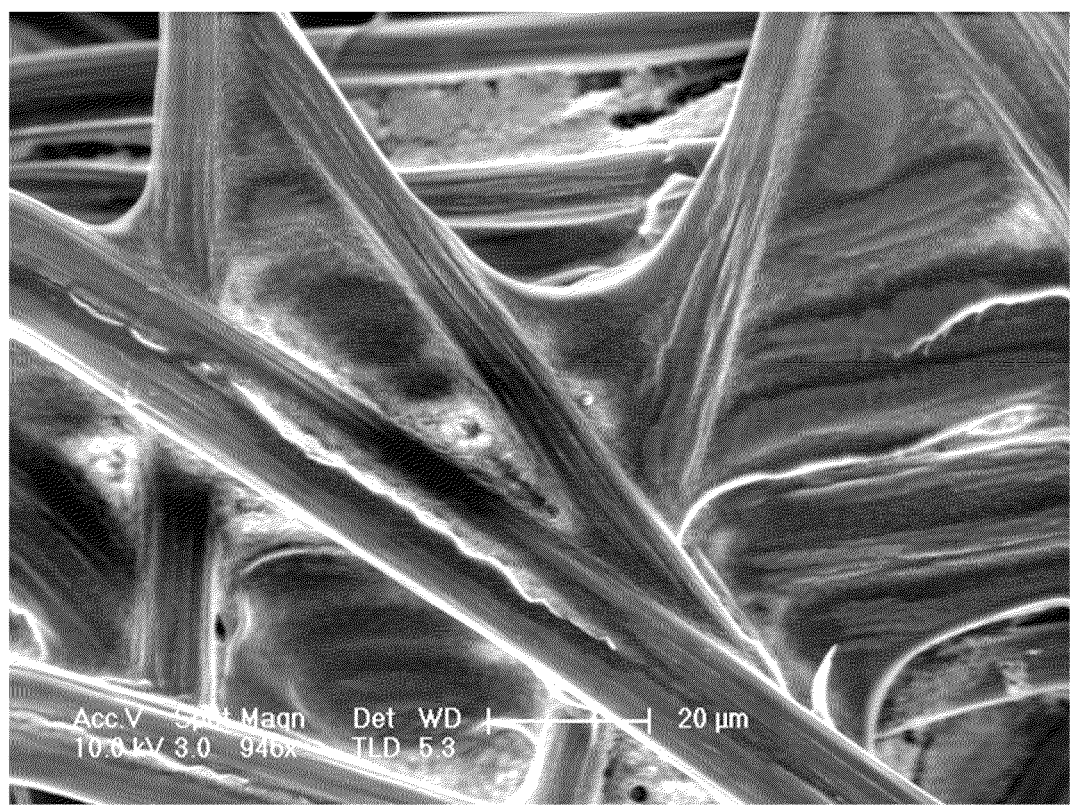
Figure 4A:
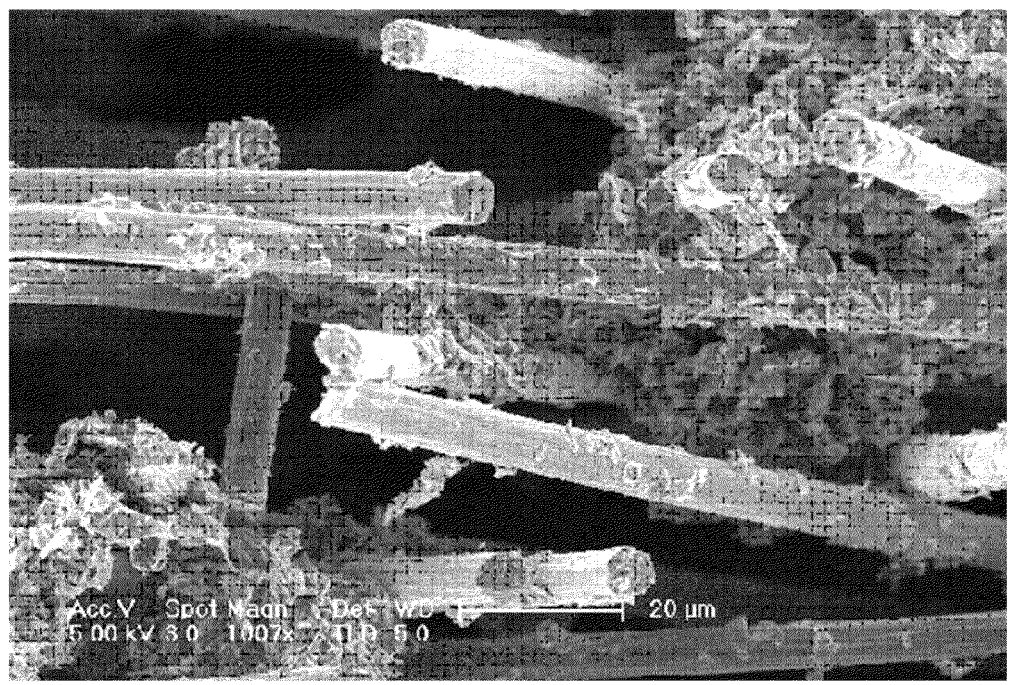
FIGS. 4A and 4B respectively show SEM photographs of the inside and the rear side of an electrode substrate according to Comparative Example 1.
Figure 4B:
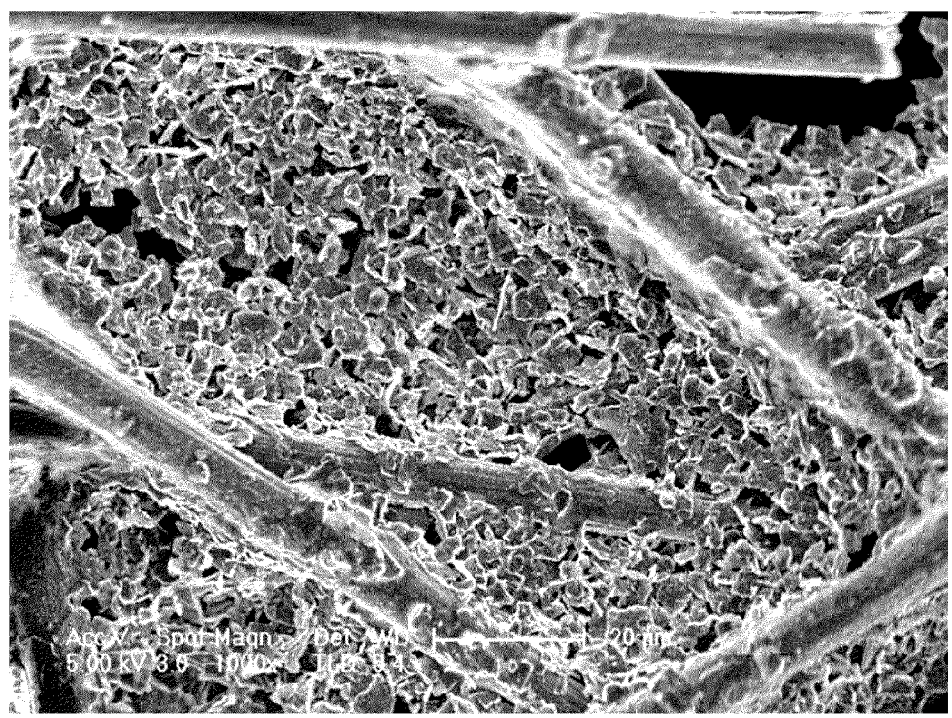

FIGS. 3A and 3B provides SEM photographs showing internal and rear views of the electrode substrate according to Example 1, and FIGS. 4A and 4B SEM photographs showing internal and rear views of the electrode substrate according to Comparative Example 1.

Referring to FIG. 3A and FIG. 4A showing internal views of the electrode substrates, the electrode substrate of Example 1 included carbon particles in the conductive substrate, in which pores were dense. On the other hand, the electrode substrate of Comparative Example 1 included polytetrafluoroethylene (PTFE) sparsely agglomerated in the conductive substrate.

Referring to FIGS. 3B and 4B, the electrode substrate of Example 1 showed a smooth surface, that is, a film, while the electrode substrate of Comparative Example 1 showed agglomerated particles with several micro sizes on the surface. Accordingly, the electrode substrate of Example 1 turned out to have denser pores.

Experimental Example 2

Pore Size and Porosity of Electrode Substrate

The electrode substrates according to Examples 1 and 2 and Comparative Examples 1 and 2 were measured regarding average pore size and porosity. The results are provided in the following Table 1.

The average pore size and porosity were measured by respectively using a Mercury intrusion porosimetry (MIP) (Micromeritics, Inc.) equipment. Herein, the sample had a uniform area ranging from 10 to 20 cm².

TABLE 1

|  | Example | | Comparative Example | |
|---|---|---|---|---|
|  | 1 | 2 | 1 | 2 |
| Average pore diameter (μm) | 29.2 | 26.2 | 48.0 | 42.3 |
| Porosity (%) | 72.6 | 68.3 | 78.5 | 76.6 |
| Thickness of microporous layer (μm) | 60 | 60 | 140 | 120 |
| Cracks of microporous layer | None | None | Generated | Generated |

Referring to Table 1, when the electrode substrates according to Examples 1 and 2 included carbon particles in the conductive substrate, it had an average pore with a diameter ranging from about 20 μm to about 40 μm and porosity ranging from about 30 volume % to about 80 volume %. On the other hand, the electrode substrates according to Comparative Examples 1 and 2 had a pore beyond the average pore size and porosity range.

Manufacturing of Fuel Cell

The electrodes according to Examples 1 and 2 and Comparative Examples 1 and 2 were used as a cathode and an anode, and a polymer electrolyte membrane for a fuel cell (a catalyst feated membrane-type fuel cell MEA, Dupont Co.; Nafion 115 Membrane) was placed between the cathode and the anode. They were hot-rolled together, fabricating a membrane-electrode assembly.

The membrane-electrode assembly was inserted between gaskets and between two splits having a gas channel and a cooler channel with a predetermined shape and then, compressed between copper end plates, fabricating a unit cell.

Experimental Example 3

Fuel Cell Performance Evaluation

The unit cells according to Examples 1 and 2 and Comparative Example 1 were operated under the following conditions and evaluated regarding battery characteristic. The results are provided in FIG. 5.

Specifically, the unit cells were operated at 60° C.; under a humidifying condition of Anode RH 80%/Cathode RH (Dry), a CC mode (@270 mA/cm²) operation condition, and a $H_2$/air ($\lambda$=1.2/2.0, 61.9/245.6 ccm) Fuel Stoich. condition.

Figure 5:
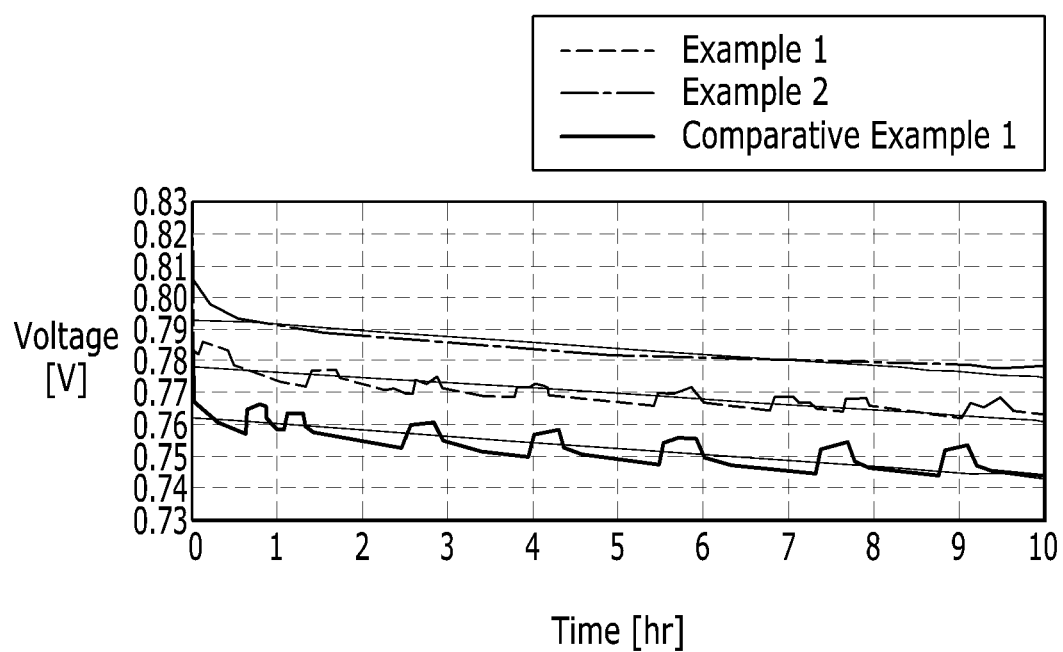
FIG. 5 is a graph showing voltage changes of the fuel cells according to Examples 1 and 2 and Comparative Example 1.

FIG. 5 shows a graph showing voltage change of a fuel cell according to Examples 1 and 2 and Comparative Example 1. Referring to FIG. 5, the fuel cells including carbon particles in the conductive substrate according to Examples 1 and 2 had excellent performance compared with the fuel cell according to Comparative Example 1.

While this invention has been described in connection with what is presently considered to be practical exemplary embodiments, it will be appreciated by those skilled in the art that various modifications and changes may be made without departing from the scope of the present disclosure. The drawings and the detailed description of certain inventive embodiments given so far are only illustrative, and they are only used to describe certain inventive embodiments, but are should not used be considered to limit the meaning or restrict the range of the present invention described in the claims. Indeed, it will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Therefore, it will be appreciated to those skilled in the art that various modifications may be made and other equivalent embodiments are available. Accordingly, the actual scope of the present invention must be determined by the spirit of the appended claims, and equivalents thereof.

What is claimed is:
1. An electrode for fuel cell, comprising:
   an electrode substrate including a conductive substrate and a fluorinated resin, the electrode substrate further including a carbon particle, wherein the carbon particle is formed inside the electrode substrate, or the carbon particle is formed inside and on the surface of the electrode substrate; and
   a catalyst layer disposed on the electrode substrate,
   wherein the electrode substrate comprises a pore with an average diameter ranging from about 20 μm to about 40

μm and porosity ranging from about 68.3 volume % to about 72.6 volume % based on a total volume of the electrode substrate, wherein the electrode substrate further includes a microporous layer, wherein the microporous layer has a thickness ranging from about 3 μm to about 80 μm, and wherein the carbon particle forms an agglomerate with an average particle diameter of about 100 nm to about 10 μm.

2. The electrode of claim 1, wherein the average pore diameter is between about 20 μm to about 30 μm.

3. The electrode of claim 1, wherein the electrode substrate has a micropore diameter of less than about 50 μm.

4. The electrode of claim 1, wherein the electrode substrate has a macropore diameter of about 50 μm or more.

5. The electrode of claim 1, wherein the conductive substrate is formed of a material selected from the group consisting of a carbon paper, a carbon cloth, a carbon felt, a carbon fiber, and a combination thereof.

6. The electrode of claim 1, wherein the carbon particle is formed of a material selected from the group consisting of carbon black, carbon powder, acetylene black, porous carbon, graphite, carbon nanotube (CNT), a carbon nanofiber (CNF), activated carbon, and a combination thereof.

7. The electrode of claim 1, wherein the carbon particle has an average particle diameter of about 3 nm to about 20 nm.

8. The electrode of claim 1, wherein the carbon particle is formed in a sphere or a shapeless shape.

9. The electrode of claim 1, wherein the fluorinated resin is formed of a material selected from the group consisting of polytetrafluoroethylene (PTFE), polyvinylidene fluoride, polyhexafluoropropylene, polyperfluoroalkylvinylether, polyperfluorosulfonylfluoridealkoxyvinyl ether, fluorinated ethylene propylene, polychlorotrifluoroethylene, and one or more a copolymers thereof.

10. The electrode of claim 1, wherein the carbon particle is formed inside the electrode substrate.

11. The electrode of claim 1, wherein the carbon particle is formed positioned on the conductive substrate.

12. A membrane-electrode assembly for a fuel cell, comprising
an anode and a cathode formed facing each other; and
a polymer electrolyte membrane disposed between the anode and the cathode,
wherein at least one of the anode and the cathode comprises the electrode of claim 1.

13. A fuel cell system, comprising
a fuel supplier configured to supply mixed fuel of fuel and water;
a reforming part in fluid communication with the fuel supplier and configured to reform the mixed fuel to generate hydrogen;
a stack in fluid communication with the reforming part, wherein the stack includes the electrode of claim 1, and wherein the stack is configured to generate electric energy by performing an electrochemical reaction between the hydrogen gas supplied from the reforming part and an oxidizing agent; and
an oxidizing agent supplier configured to supply an oxidizing agent to the reforming part and to the stack.

14. The electrode of claim 1, wherein the electrode substrate has an average pore diameter of between about 26.2 μm and about 29.2 μm.

* * * * *